United States Patent [19]

Athey

[11] Patent Number: 4,536,932
[45] Date of Patent: Aug. 27, 1985

[54] METHOD FOR ELIMINATING LOW CYCLE FATIGUE CRACKING IN INTEGRALLY BLADED DISKS

[75] Inventor: Roy L. Athey, North Palm Beach, Fla.

[73] Assignee: United Technologies Corporation, Hartford, Conn.

[21] Appl. No.: 443,516

[22] Filed: Nov. 22, 1982

[51] Int. Cl.³ .................... B21K 3/04; B23P 15/02
[52] U.S. Cl. ..................... 29/156.8 B; 29/156.8 R; 29/527.2; 72/46; 416/241 R; 416/244 A
[58] Field of Search ........ 29/156.8 B, 527.2, 156.8 R; 72/46; 416/244 A, 241 R

[56] References Cited

U.S. PATENT DOCUMENTS

| | | | |
|---|---|---|---|
| 2,357,269 | 8/1944 | Russell et al. | 72/46 X |
| 2,623,727 | 12/1952 | McLeod | 29/156.8 R |
| 2,633,776 | 4/1953 | Schenk | 416/244 A |
| 2,756,493 | 7/1956 | Hall | 72/46 X |
| 2,869,227 | 1/1959 | Bradstreet | 72/46 X |
| 3,118,330 | 1/1964 | Geipel | 72/46 |
| 3,122,823 | 3/1964 | Lazar et al. | 29/156.8 B |
| 3,130,481 | 4/1964 | Ahlen | 29/156.8 B |
| 3,650,005 | 3/1972 | Kamiya et al. | 29/527.2 |
| 3,885,294 | 5/1975 | Chaundy et al. | 416/244 A |
| 4,051,708 | 10/1977 | Beane et al. | 72/354 |
| 4,074,559 | 2/1978 | Beane et al. | 29/156.8 B X |
| 4,279,575 | 7/1981 | Avery | 416/244 A |

FOREIGN PATENT DOCUMENTS

| | | | |
|---|---|---|---|
| 2423036 | 12/1974 | Fed. Rep. of Germany | 416/244 A |
| 2442739 | 3/1976 | Fed. Rep. of Germany | 416/244 A |
| 0271431 | 1/1951 | Switzerland | 416/244 A |

Primary Examiner—Charlie T. Moon
Assistant Examiner—Ronald S. Wallace
Attorney, Agent, or Firm—Stephen E. Revis

[57] ABSTRACT

Stress relief for the rim of an integrally bladed rotor made from a forging preform is provided by forming a plurality of radially extending circumferentially spaced-apart slots around the periphery of the preform. The slots are forged closed in a subsequent forming step. An oxide layer on the slot surfaces prevents the surfaces from bonding together when forged closed. The blades are formed between slots during the forging or by machining after forging.

7 Claims, 4 Drawing Figures

METHOD FOR ELIMINATING LOW CYCLE FATIGUE CRACKING IN INTEGRALLY BLADED DISKS

DESCRIPTION

1. Technical Field

This invention relates to integrally bladed disks. 2. Background Art

It is known that cast integrally bladed disks for turbine rotors, such as might be used in automotive gas turbine engines or for aircraft gas turbine engines, suffer from low cycle fatigue (LCF) cracking at the rim of the disk. This cracking is caused by a thermal gradient which exists from the rim, which is exposed directly to the hot turbine gases, to the center of the disk, which is relatively cool. The problem is not present on conventionally bladed disks since the rim is protected from high temperatures by the blade platforms and is discontinuous due to the presence of the blade slots formed therein which allow some movement of the disk metal at the rim. To relieve the stresses in the rim of a cast integrally bladed disk, pockets or slots are formed in the rim between blades. These slots relieve some of the thermal stresses in the rim. A hole is drilled at the base or radially innermost portion of each slot so as to form a relatively large radius which acts as a crack stopper to prevent a crack from beginning at the base of the slot and propagating further into the disk. A rivet is then inserted into each drilled hole to prevent gas leakage; but leakage through the slots themselves still occurs. In addition to the undesirable leakage, the stress-relief slots and their associated rivets are a significant part of the cost of a turbine rotor, and from that point of view are undesirable.

Efforts are presently underway to improve and develop methods for forging the hub or disk portion of the rotor and to machine the blades from an enlarged rim portion of the forging, or to entirely forge a bladed disk, such as by the Gatorizing ® forging process described in commonly owned U.S. Pat. No. 4,051,708. It is desirable to prevent cracks from forming in the rim of these forged rotor disks due to thermal gradients; however, it is also desirable to minimize the gas leakage and expense associated with the prior art method for preventing such cracks.

DISCLOSURE OF INVENTION

One object of the present invention is to eliminate low cycle fatigue cracks in the rim of an integrally bladed disk.

Another object of the present invention is to provide stress relief for the rim of an integrally bladed rotor without creating a leakage path through the disk.

According to one aspect of the present invention, a method for forming an integrally bladed rotor disk includes the steps of forming a plurality of circumferentially spaced-apart stress relief slots in the outer periphery of a disk preform and forging the slots closed without the surfaces of the slots becoming bonded together, the closed slots being located such that they are disposed between the blades which are also formed from the preform.

The slots, although forged closed, still provide the desired stress relief at the rim in the finished rotor disk by eliminating the hoop stresses. To prevent the surfaces of the slots from bonding together upon being forged shut they may be coated with an oxide or they may be oxidized by a suitable heat treatment, unless they already have a surface oxide layer.

Preferably, each slot in the preform is formed with a radius at the base thereof to avoid stress risers. The slot may be forged closed around a rod of circular cross section disposed at the base of the slot to assure that the base of the closed slot maintains a rounded form, although such a precaution may not be required.

According to a preferred embodiment of the present invention, radial slots are machined into the periphery of a plate-shaped forging preform having material at its periphery which is to be formed into blades. The slotted preform is heat treated in an air furnace to oxidize the surfaces of the slots. The preform is placed in a forging press having suitable dies; and the disk is forged and the slots are forged closed while the blades are simultaneously formed in the periphery of the disk between the closed slots, such as by the Gatorizing forging process described in commonly owned U.S. Pat. Nos. 3,519,503 and 4,051,708, incorporated herein by reference.

The present invention provides an inexpensive means of providing stress relief for the rim of an integrally bladed forged turbine disk without introducing any leakage path through the disk.

The foregoing and other objects, features and advantages of the present invention will become more apparent in the light of the following detailed description of preferred embodiments thereof as illustrated in the accompanying drawing.

BEST MODE FOR CARRYING OUT THE INVENTION

While many techniques are known in the art for forming integrally bladed rotor disks, the present invention is adapted for use in connection with integrally bladed rotors wherein at least the disk portion of the rotor is forged.

As used herein, the phrase "forging preform" or "preform" is intended to mean either a billet or other article which must undergo at least one additional forging step to form the finished product. "Plate-shaped" preform is intended to mean a preform of generally circular or annular cross section, having an outer diameter greater than its thickness. Thickness need not be constant.

Figure 1:
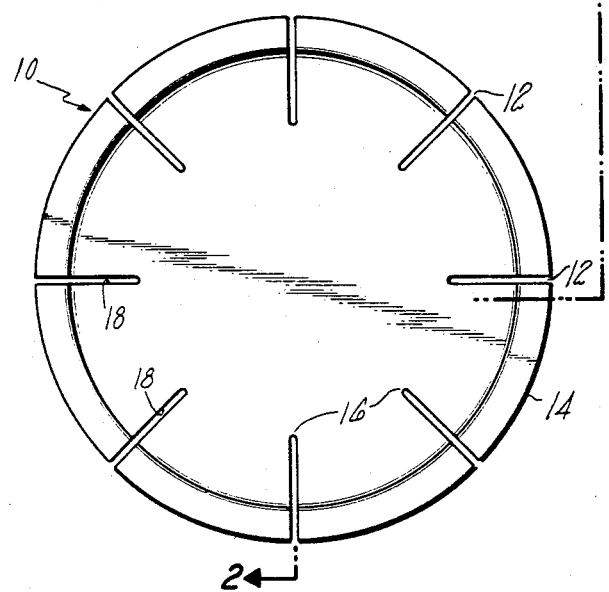
FIG. 1 is a forging preform having slots formed therein in accordance with the teachings of the present invention.
Figure 2:
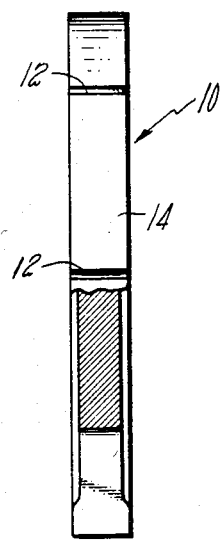
FIG. 2 is a view of the forging preform of FIG. 1 taken generally along the line 2—2.

In accordance with the present invention and as shown in FIGS. 1 and 2, a plate-shaped forging preform 10 has a plurality of slots 12 which extend from the rim or periphery 14 toward the center of the preform. The slots are circumferentially disposed about the periphery 14 of the preform 10 and extend through the full thickness of the preform. They are located such that each will be positioned between a pair of adjacent blades in the finished rotor.

The slots may be formed by any known technique, such as by machining using an abrasive wheel. If the preform itself is a forging, the slots could be formed during the forging of the preform by the use of suitable dies. To avoid stress risers, the base 16 of each slot 12 is preferably formed with a radius, as is shown in FIG. 1.

The slots 12 are completely closed in a subsequent forging operation. Since it would defeat the purposes of the present invention if the surfaces 18 of the slots 12 became bonded or welded together as a result of this subsequent forging step, it is necessary that steps be taken to assure that such bonding or welding does not occur. Preferably an oxide layer similar to the stop-offs used in brazing (see Metal Handbook, 8th Edition, Volume 6, "Welding and Brazing", pp. 602–603, American Society for Metals, Ohio (1971)) is applied or is formed on the surfaces 18 of the slots 12. This may be accomplished by a suitable heat treatment or by simply coating the sides of the slot with a suitable stop-off (e.g., boron nitride). If, for example, the preform is made from a nickel-base superalloy such as wrought IN 100, or the like, the oxide could be formed by heating the preform in an air furnace to a temperature above 1000° F. for at least 30 minutes. If the slots are forged into the preform at the time of forming the preform, an oxide layer would form on the surfaces 18 during forging and the preform would not need a separate oxide treatment.

Figure 3:
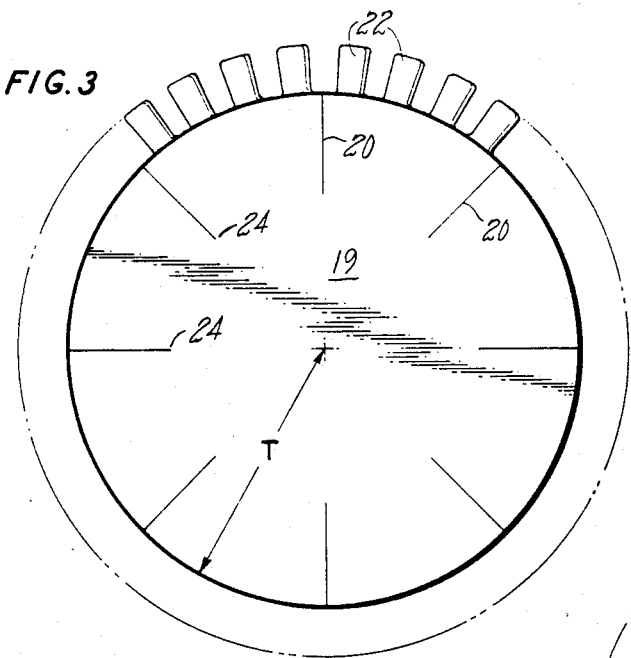
FIG. 3 shows an integrally bladed rotor disk formed from the preform of FIG. 1 in accordance with the teachings of the present invention.

The slotted preform is then placed in a forging press to further shape it into a rotor disk 19 and to completely close the slots 12 thereby forming forging laps 20 (see FIG. 3) at each slot location. In actuality these forging laps may be difficult to discern with the naked eye. The blades 22 may or may not be forged simultaneously with the closing of the slots. For example, an additional forging step could be used to further shape the disk and form the blades; or, after the slots have been closed the blades could be machined (such as by electrochemical or electric discharge machining) from the material at the periphery of the forged disk.

The primary cause of LCF cracking is the steep radial temperature gradient across the disk which results in high hoop stresses. The slots (forging laps) relieve these stresses since they break up the hoop. The hoop is reformed at the bases 24 of the forging laps; however, the hoop stresses are much lower due to the smaller temperature gradient from the bases 24 to the center of the disk. The length of the slots 18 formed in the preform 10 is selected to assure that, in the finished rotor, the stresses will be so low there will be no chance of LCF cracking at the bases 24 of the forging laps 20. The minimum slot length may initially be determined by theoretical analysis; but some trial and error may ultimately be required. The length of the forging laps 20 will, of course, always be less than the radial thickness T of the disk 19.

If LCF cracks are still a problem at the bases 24 of the forging laps 20 due to the creation of stress risers, the slots may be forged closed around a rod of circular cross section disposed along the base of the slot to assure that a suitably large radius is maintained at the base of the slot after it is closed. The term "rod" is intended to encompass within its meaning wires as well as rivets or the like. The rods may be made from the same material as the preform or from any metal which has a coefficient of expansion similar to that of the preform material.

Figure 4:
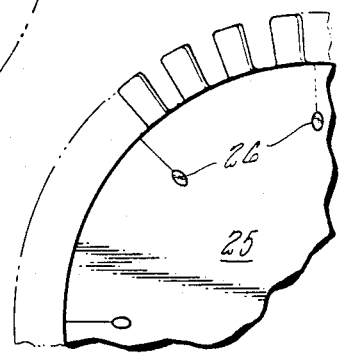
FIG. 4 shows a portion of an integrally bladed rotor disk according to an alternate embodiment of the present invention.

FIG. 4 shows a portion of an integrally bladed disk 25 according to the present invention wherein the stress relief slots were forged closed around a rod 26 (shown in cross section) disposed along the base of the slots. As can be seen, the rod 26, although compressed to a somewhat elliptical shape, has maintained a radius at the base of the closed slot.

It is particularly preferred to use the method of the present invention in conjunction with the aforementioned Gatorizing forging process. Either a cylindrical billet of appropriate size or a billet which has been upset between flat plates or between dies (to pre-shape it) may be used as a forging preform. As explained in considerable detail in the aforementioned U.S. Pat. No. 3,519,503, the preform or the billet from which the preform is made must have been worked in compression, such as by extrusion or by other means, under conditions which result in its exhibiting superplastic behavior at the strain rate and temperature of the isothermal forging operation which is to follow, without the alloy incurring substantial grain growth during the forging. After forging, the alloy may be restored to a normal condition of high strength and hardness by conventional heat treatment. The Gatorizing process is useful with any high strength, precipitation-hardened alloys such as, but not limited to, alloys of titanium, nickel, cobalt, and iron.

To use the Gatorizing process in conjunction with the present invention, a suitable number of circumferentially spaced-apart slots of the appropriate radial length are machined (such as with an abrasive carbide wheel) through the thickness of an appropriately configured preform which has been worked in accordance with the requirements of the Gatorizing process. The slots are located such that they will utlimately be centered between the blades of the finished rotor. If, for example, the preform is made from IN 100, a nickel base superalloy, the inside surfaces of the slots would then be coated with boron nitride. The coated preform is placed in a Gatorizing forging press which may be of the type shown in commonly owned U.S. Pat. No. 4,074,559, which is incorporated herein by reference and from which details of the forging apparatus may be obtained. The superplastic material near the periphery of the preform is forced into a plurality of circumferentially disposed blade-forming dies and, simultaneously, the slots are forged closed as the disk is shaped to substantially its final configuration. Subsequently, the integrally bladed disk is removed from the die, and the alloy from which it is made is restored to its normal condition of high strength and hardness by conventional heat treatment.

In one test, a plate-shaped preform had an outer diameter of approximately 4.76 inches and thickness of approximately 0.46 inch. Although not of importance as regards the present invention, the preform had no central hole, but rather had an integral shaft approximately 1.25 inches long and 0.875 inch diameter extending outwardly from one side thereof. This preform was forged from a cylindrical billet of a wrought precipitation hardenable nickel-base alloy (AF2-1DA) by the Gatorizing forging process at a temperature of 2050°-2075° F. and a strain rate starting at 0.5 in./in./min. and ending at 0.1 in./in./min. Ten circumferentially spaced-apart slots were then machined through the preform thickness, each slot being 0.52 inch long and 0.70 inch wide, with a radius at the bottom of each. The slotted preform was heated in air at 1800° F. for one hour to form an oxide coating over all exposed surfaces. Rods of material similar to the preform (but having lower temperature capability) having a diameter approximately equal to the width of the slots were placed at the bottom of each slot. The slotted preform was then forged again by the Gatorizing process to its final shape which included 30 blades approximately 0.4 inch long. The Gatorizing process temperature was the same as before, but the strain rate throughout this forging step was maintained at 0.1 in./in./min. The slots were forged completely shut during this blade forming step; and the final rotor diameter and thickness (excluding blades) remained about the same as that of the slotted preform. The finished part looked similar to the bladed rotor of FIG. 4. The part was designed to operate at a rim temperature of 1600° F. and a center temperature of 600° F. (i.e., 1000° F. ΔT from rim to center). In a cyclic test of this part designed to roughly simulate operating stresses the rim was heated while the center was kept relatively cool. No cracking of the disk occurred during the cyclic testing.

Although the invention has been shown and described with respect to a preferred embodiment thereof, it should be understood by those skilled in the art that other various changes and omissions in the form and detail thereof may be made therein without departing from the spirit and the scope of the invention.

I claim:

1. In a method for forming an integrally bladed rotor disk from a plate-shaped forging preform having a rim, the steps of:

forming a plurality of circumferentially spaced-apart slots in said preform, said slots having a base, each slot extending radially from said rim to said base and extending axially through the full thickness of the preform; and forming the rotor blades from the preform and forging the disk from the preform, including completely closing said slots from the slot base to the slot rim by forging to form forging laps along the radial extent of each slot without bonding together the surfaces of said slots, said forging laps being located circumferentially between adjacent blades.

2. The method according to claim 1 wherein prior to the step of forging said slots closed, the surfaces of said slots are oxidized to prevent their becoming bonded together.

3. The method according to claim 2 wherein the step of forming the rotor blades and forging the disk comprises forging said blades simultaneously with or after the step of closing said slots.

4. The method according to claim 3 wherein said preform is made from a superalloy.

5. The method according to claim 2 wherein the step of oxidizing the surfaces of said slots comprises coating the slot surfaces with an oxide.

6. The method according to claim 3 wherein each of said slots are formed with a radius at the base thereof and prior to the step of forging said slots closed a metal rod is disposed along the base of each of said slots, whereby each of said slots is forged closed around said rod thereby maintaining a radius at the base of each of said forging laps.

7. The method according to claim 2 wherein after said step of closing said slots, rotor blades are machined from said forged preform.

* * * * *